Patented Mar. 22, 1949

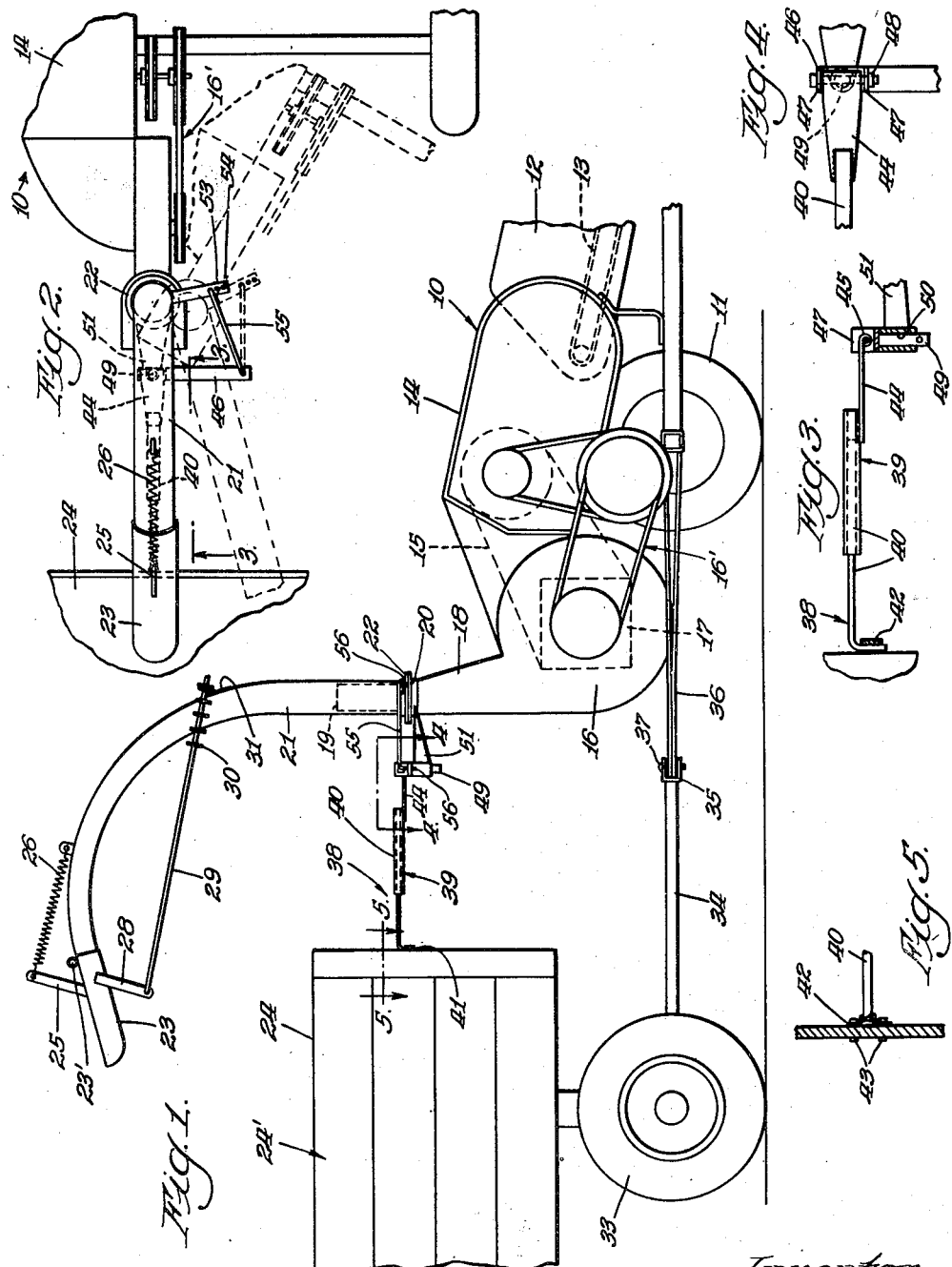

2,465,156

UNITED STATES PATENT OFFICE 2,465,156

BLOWER FOR HAY CHOPPERS

Edwin F. Huddle, Elmwood Park, Ill., assignor to International Harvester Company, a corporation of New Jersey Application December 21, 1946, Serial No. 717,679

10 Claims. (Cl. 214—41)

This invention relates to an improved blower construction utilized with a field traversing farm implement such as a hay chopper.

It is the prime object of this invention to provide an improved hay blower construction and a pneumatic discharge means for directing treated vegetation into the wagon box of a trailing wagon.

Another object is to provide an improved elevating conveyor for a blower, said conveyor including a discharge portion which is adapted to continuously elevate treated vegetation into a wagon box of a trailing wagon irrespective of turning movement between the blower and the trailing wagon.

It is still another object to provide an improved elevating and discharge means for a blower which is connected to a trailing wagon, said elevating and discharge means including a linkage connection operable to maintain said elevating and discharge portion within the confines of the wagon box during respective turning movement of the blower and the trailing wagon.

Other and further objects of this invention will become apparent upon reading the annexed specification when examined with the accompanying drawing, in which:

Figure 1 is a side elevational view of a field traversing implement such as a hay chopper having a portion of a trailing wagon attached thereto;

Figure 2 is a plan view of a portion of the device shown in Figure 1;

Figure 3 is a detail sectional view taken along the line 3—3 of Figure 2;

Figure 4 is a detail plan view taken along the line 4—4 of Figure 1; and

Figure 5 is a detail sectional view taken along the line 5—5 of Figure 1.

Referring to the drawing, a field traversing implement such as a hay chopper is generally indicated by the reference character 10. The hay chopper 10 is mounted for movement on ground wheels 11. As shown in Figure 1, only a portion of the hay chopper has been illustrated and this portion includes a scoop-type platform 12 from which cut and gathered vegetation is conveyed by means of a conveyor 13 to a cutting chamber 14. After the vegetation has been comminuted within the chamber 14 it is then carried by means of a chute or conduit 15 to an elevating device or blower 16. The blower 16 is provided with an opening 17 through which the treated vegetation enters. A fan construction (not shown) is suitably mounted within the blower 16 and is driven by a suitable drive mechanism 16' from the chopping implement.

The blower 16 includes a vertical conduit 18 which extends upwardly to a point indicated by the reference character 19. An annular bearing collar 20 is rigidly secured to the vertical conduit 18 as best shown in Figure 1. A curved discharge conduit 21 is in telescoping engagement with the vertical conduit 18. The curved conduit 21 has at its lower portion an annular bearing collar 22 which is rigidly secured to said conduit. The bearing collar 22 is in abutment with the collar 20 and by virtue of the telescoping connection between the vertical conduit 18 and the curved conduit 21 a swiveling connection is thus provided. The discharge conduit 21 is provided at its discharge end with a discharge spout or deflecting hood 23 which is positioned above a box 24 of a trailing wagon 24'.

The deflecting hood 23 is provided with an integral arm 25 which extends upwardly and has connected thereto a spring 26. The spring 26 is connected to a portion of the curved conduit 21. The deflecting hood 23 is pivotally connected to the end of the said dishcarge conduit as indicated by the pivotal connection 23'. A downwardly extending arm 28 is also rigidly connected to the deflecting hood 23 and is in turn connected to a cable 29. The cable 29 is provided with a series of stops 30 which are adapted to engage a slot (not shown) in a bracket 31. By means of the stops 30 the operator can vertically adjust the location of the deflecting hood and thereby direct the discharging vegetation with respect to any desired position within the wagon box 24 fore and aft.

The trailing wagon 24' is supported on ground wheels 33. A hitch for the trailing wagon is provided by means of a wagon tongue 34 which extends forwardly and has connected thereto a clevis 35 at its foremost end. The clevis 35 is in telescoping engagement with a drawbar 36. A hitch pin 37 extends through openings in the clevis 35 and the drawbar 36 for suitably connecting said members together. By means of the pin 37 the hay chopper 10 is free to swing or turn about a vertical axis with respect to the trailing wagon 24'.

The reference character 38 generally indicates an improved construction for maintaining the discharge conduit 21 within the confines of the wagon box 24 during turning movement of the chopper 10 with respect to the trailing wagon 24'. The construction 38 includes a longitudinally extending member 39 consisting of a pair of telescoping arms 40. As best shown in Figure 3 the rearmost telescoping arm 40 is provided at one end with a downwardly extending end portion 41. The end portion 41 is held to the wagon box 24 against swinging movement in a horizontal plane by means of a bracket 42 rigidly connected to the wagon box 24 by means of bolts 43. Thus the rear telescoping member 40 is unable to swing horizontally with respect to the wagon box 24 but by virtue of a relatively loose connection with the bracket 42 is able to swing or hinge vertically. The foremost telescoping member 40 is rigidly connected to a hinge member 44. The hinge member 44 is provided at its foremost end with a loop portion 45. As best shown in Figures 3 and 4 a laterally extending arm or member 46 is provided at one of its ends with a pair of laterally spaced ear portions 47. The hinge member 44 is positioned between the ear portions 47, and a connecting bolt 48 extends through the ear portions 47 and through the loop 45 to hingedly connect said hinge member 44 to the arm 46.

As best shown in Figure 3 the laterally extending arm 46 is provided with a downwardly projecting swivel pin 49. The swivel pin 49 is journaled in a bearing portion 50 of a longitudinally extending arm 51. The longitudinally extending arm 51 is rigidly secured to the annular bearing collar 20 which in turn is rigidly secured to the vertical conduit 18.

As best shown in Figures 1 and 2 a laterally extending member or arm 53 of relatively shorter length than the arm 46 is rigidly secured to the annular bearing collar 22 which is in turn rigidly connected to the curved discharge conduit 21. The laterally extending arm 53 is provided with adjusting openings 54. A longitudinally extending link 55 is pivotally connected to the laterally extending arms 46 and 53 by means of downwardly extending end portions 56.

During the operation of the chopper 10 the vegetation is gathered, comminuted and then directed to the blower 16. The blower 16 pneumatically elevates the vegetation into the wagon box 24 by means of the discharge conduit 21. When the end of the field is reached it is desired to turn the chopper unit with respect to the trailing wagon 24'. Horizontal turning movement of the chopper 10 and the blower 16 with respect to the trailing wagon 24' is about the vertical axis of the hitch pin 37. The vertical axis of the hitch pin 37 is substantially in alignment with the swivel pin 49 of the laterally extending arm 46. As horizontal swinging movement of the drawbar 36 with respect to the wagon tongue 34 takes place, the blower 16 and the conduit 18 also swing about the vertical axis of the swivel pin 49 by means of the longitudinally extending arm 51.

By virtue of the bracket 42 and its connection with the rear telescoping member 40 a limited amount of vertical hinging movement of the longitudinal member 39 is afforded. Thus, as the hay chopper 10 and the trailing wagon 24' are moving over uneven ground the telescoping members 40 are free to adjust themselves so that buckling of the members is eliminated.

As shown in Figure 2 by the dashed lines, the hay chopper has been turned with respect to the trailing wagon 24'. The position of the discharge conduit 21 has also changed but the discharge end of the same is still above and within the confines of the wagon box 24. The operation and arrangement of the arms 46 and 53 and the link 55 are effective to accomplish this result despite angularity of the position of the chopper and blower when turning with respect to the trailing wagon 24'.

As the blower and chopper pivot about the vertical axis of the hitch pin 37 and the swivel pin 49, the link 55 will maintain the ends of the arms 46 and 53 in horizontal spaced relation. Since the arm 46 is fixed against angular movement in a horizontal plane, turning movement of the blower 16 will move the link 55 and the arm 53 to a position whereby the conduit 21 will remain above the wagon box of the trailing wagon. Stated in another manner, the linkage arrangement results in a swivelling of the conduit 21 relative to the blower, so that the discharge portion of the conduit remains above the wagon box despite the angular position of the chopper with respect to the wagon during turning. The degree of swivelling movement of the conduit can readily be altered by changing the position of the link 55 on the arm 53. Openings 54 are provided for that purpose.

It can thus be seen that a suitable linkage arrangement has been provided which will maintain the discharge portion of the blower above the wagon box 24, so that elevated material may be continuously discharged into the wagon despite turning movement of the hay chopper 14 with respect to the wagon. It is to be understood that various modifications and changes may be made in this construction without departing from the spirit of the invention as disclosed nor as defined within the scope of the appended claims.

What is claimed is:

1. A field traversing farm implement having a trailing wagon hitched thereto, a blower connected to said implement, a discharge conduit connected to said blower for swivelling movement with respect thereto and adapted to discharge material into said wagon, means for maintaining said discharge conduit above said wagon during turning movement of said wagon with respect to said implement including, a transversely extending arm fixedly positioned against angular movement in a horizontal plane with respect to said wagon, a relatively shorter arm connected to said discharge conduit, and means connecting said arms for retaining the end portions thereof in horizontal spaced relation during turning.

2. A field traversing farm implement having a trailing wagon hitched thereto, a device for elevating crops treated by said farm implement, a discharge portion connected to said elevating device for discharging crop into said trailing wagon, said discharge portion having swivelling movement about a vertical axis, a longitudinally extending member connected to said wagon, a laterally extending arm connected to said longitudinally extending arm in fixed relation, a laterally extending arm connected to said discharge portion, and means connecting said arms for retaining the ends thereof in horizontal spaced relation during turning movement of said implement relative to said wagon whereby said discharge portion will be swivelled and continuously directed into said wagon.

3. A field traversing farm implement having a trailing wagon hitched thereto for swinging movement about a vertical axis, a blower on said implement, a discharge conduit communicating with said blower and swivelly supported thereon, a discharge portion connected to said conduit and extending over said trailing wagon, a linkage arrangement for continuously directing said discharge portion into said trailing wagon during relative turning movement between said implement and said wagon, including a first laterally extending arm rigidly connected to said discharge conduit, a second laterally extending arm fixed against horizontal movement with respect to said trailing wagon, and a link pivotally connected to said first-mentioned arm and extending longitudinally for pivotal connection to said second-mentioned arm.

4. A field traversing farm implement having a trailing wagon hitched thereto, a device for elevating crops treated by said farm implement, a discharge portion pivotally connected to said elevating device for discharging crop into said trailing wagon, and means for continuously directing said discharge portion into said trailing wagon regardless of relative angular movement between said wagon and said implement including, a pair of horizontally spaced laterally extending members, one of said members being fixed against angular movement in a horizontal plane with respect to said wagon, the other of said members being fixed with respect to said discharge portion, and means connecting said laterally extending members for maintaining the same in said spaced relation during turning movement of said implement relative to said wagon.

5. A field traversing farm implement having a trailing wagon hitched thereto, a device for elevating crops treated by said farm implement, a discharge portion pivotally connected to said elevating device for discharging crop into said trailing wagon, and means for continuously directing said discharge portion into said trailing wagon regardless of relative angular movement between said wagon and said implement including, a pair of horizontally spaced laterally extending members, one of said members being fixed against angular movement in a horizontal plane with respect to said wagon, the other of said members being fixed with respect to said discharge portion and a substantially longitudinally extending member pivotally connecting said spaced members for retaining the same in said spaced relation during turning movement of said implement relative to said wagon.

6. A field traversing farm implement having a trailing wagon hitched thereto, a blower connected to said implement, a discharge conduit pivotally connected to said blower for discharging treated material into said wagon, a longitudinally extending member connected to said wagon, a pair of spaced laterally extending arms, one of said arms being rigidly connected to said longitudinally extending arm, the other of said arms being rigidly connected to said discharge conduit, and a link pivotally connecting said arms in spaced relation, the point of connection of said link on one of said arms being spaced inwardly from the point of connection of said link on said other arm whereby said discharge portion will be swivelled and continuously directed into said wagon upon turning movement of said wagon relative to said implement.

7. A field traversing farm implement having a trailing wagon hitched thereto for swinging movement about a vertical axis, a blower at the rear of said implement, a first conduit communicating with said blower, a second conduit communicating with said first conduit and supported thereon for swivelling movement about a vertical axis, a discharge spout connected to said second conduit and extending over said trailing wagon, a longitudinally extending arm rigidly connected to said first conduit, means pivotally connecting said arm to said trailing wagon for pivotal movement about a vertical axis, a linkage arrangement for retaining said discharge spout over said trailing wagon during relative turning movement between said wagon and said implement including a first laterally extending arm rigidly connected to said second conduit, a second laterally extending arm rigidly connected against angular movement in a horizontal plane with respect to said trailing wagon, and a link pivotally connected to said first-mentioned arm and extending longitudinally for pivotal connection to said second-mentioned arm.

8. A field traversing farm implement having a trailing wagon hitched thereto for swinging movement about a vertical axis, a blower at the rear of said implement, a first conduit communicating with said blower, a second conduit communicating with said first conduit and supported thereon for swivelling movement about a vertical axis, a discharge spout connected to said curved conduit and extending over said trailing wagon, a longitudinal member hinged to said wagon for vertical hinging movement, a longtudinal arm rigidly connected to said first conduit, a hinge member connected to said arm for pivotal movement about a vertical axis, means connecting said longitudinal member and said longitudinal arm for respective vertical hinging movement, a linkage arrangement for retaining said discharge spout over said trailing wagon during relative turning movement between said wagon and said implement including a first laterally extending arm rigidly connected to said second conduit, a second laterally extending arm rigidly connected to said hinge member, and a link pivotally connected to said first-mentioned arm and extending longitudinally for pivotal connection to said second-mentioned arm.

9. A field hay chopper having a trailing wagon hitched thereto for swinging movement about a vertical axis, a blower at the rear of said implement, a first conduit communicating with said blower, a second conduit communicating with said first conduit and supported thereon for swivelling movement about a vertical axis, a discharge spout connected to said second conduit and extending over said trailing wagon, a pair of telescoping members, one of said telescoping members being hinged to said wagon for vertical hinging movement, a longitudinally extending arm rigidly connected to said first conduit, a hinge member pivotally connected to said arm about a vertical axis, the second of said telescoping members being connected to said hinge member for vertical hinging movement, a linkage arrangement for retaining said discharge spout over said trailing wagon during relative turning movement between said wagon and said hay chopper including a first laterally extending arm rigidly connected to said second conduit, a second laterally extending arm rigidly connected to said hinge member, and a link pivotally connected to said first-mentioned arm and extending for pivotal connection to said second-mentioned arm.

10. A field traversing farm implement having a trailing wagon hitched thereto for swinging movement about a vertical axis, a blower on said implement, a vertical conduit communicating with said blower, a curved conduit communicating with said vertical conduit and supported thereon for swivelling movement about a vertical axis, a discharge spout connected to said curved conduit and extending over said trailing wagon, a pair of telescoping members, one of said telescoping members being hinged to said wagon for vertical hinging movement, a longitudinally extending arm rigidly connected to said vertical conduit, a hinge member pivotally connected to said arm about a vertical axis, the second of said telescoping members being connected to said hinge member for vertical hinging movement, a linkage arrangement for retaining said discharge spout over said trailing wagon during relative turning movement between said wagon and said implement including a first laterally extending arm rigidly connected to said curved conduit, a second relatively longer laterally extending arm rigidly connected to said hinge member, and a link pivotally connected to said first-mentioned arm and extending longitudinally for pivotal connection to said second-mentioned arm.

EDWIN F. HUDDLE.

REFERENCES CITED

The following references are of record in the file of this patent:

UNITED STATES PATENTS

| Number | Name | Date |
|---|---|---|
| 2,343,153 | Miller | Feb. 29, 1944 |